(12) United States Patent
Chen et al.

(10) Patent No.: US 11,177,539 B2
(45) Date of Patent: Nov. 16, 2021

(54) CURRENT COLLECTOR AND SECONDARY BATTERY

(71) Applicant: Contemporary Amperex Technology Co., Limited, Ningde (CN)

(72) Inventors: Yuanbao Chen, Ningde (CN); Dongyang Shi, Ningde (CN); Ning Chen, Ningde (CN); Haizu Jin, Ningde (CN); Zhenhua Li, Ningde (CN); Fei Hu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/356,565

(22) Filed: Jun. 24, 2021

(65) Prior Publication Data

US 2021/0320383 A1 Oct. 14, 2021

Related U.S. Application Data

(63) Continuation of application No. PCT/CN2019/076294, filed on Feb. 27, 2019.

(30) Foreign Application Priority Data

Dec. 29, 2018 (CN) .......................... 201811641722.X

(51) Int. Cl.
*H01M 2/20* (2006.01)
*H01M 50/502* (2021.01)
(Continued)

(52) U.S. Cl.
CPC ....... *H01M 50/502* (2021.01); *H01M 50/147* (2021.01); *H01M 50/533* (2021.01);
(Continued)

(58) Field of Classification Search
CPC ........... H01M 10/0525; H01M 50/502; H01M 10/0436; H01M 10/049; H01M 10/058;
(Continued)

(56) References Cited

U.S. PATENT DOCUMENTS

2014/0234669 A1* 8/2014 Byun .................. H01M 50/103
429/7
2014/0349149 A1* 11/2014 Kim ...................... H01M 50/50
429/61

FOREIGN PATENT DOCUMENTS

CN 105609882 A 5/2016
CN 108198989 A 6/2018
(Continued)

OTHER PUBLICATIONS

The International Search Report for PCT Application No. PCT/CN2019/076294, dated Oct. 10, 2019, 8 pages.

*Primary Examiner* — Lingwen R Zeng
(74) *Attorney, Agent, or Firm* — Law Offices of Liaoteng Wang

(57) ABSTRACT

The present application relates to a current collector and a secondary battery. The current collector is used to electrically connect a pole and tab of a secondary battery, and comprises: a first sheet; a second sheet that is disposed to intersect the first sheet, the second sheet being used to electrically connect to the pole; a current collection unit, the current collection unit and the second sheet being disposed at two opposite sides of the first sheet in a first thickness direction thereof, and the first thickness direction thereof intersecting with a second thickness direction of the second sheet; the current collection unit comprises a first current collection sheet, the first current collection sheet is used to electrically connect to the tab, and the first current collection sheet is provided with a first connection terminal that is connected to the first sheet.

20 Claims, 8 Drawing Sheets

(51) Int. Cl.
*H01M 50/147* (2021.01)
*H01M 50/533* (2021.01)
*H01M 50/54* (2021.01)
*H01M 50/543* (2021.01)
H01M 10/04 (2006.01)
H01M 10/058 (2010.01)
H01M 50/50 (2021.01)
H01M 50/531 (2021.01)
H01M 10/0525 (2010.01)
H01M 50/538 (2021.01)

(52) U.S. Cl.
CPC .......... *H01M 50/54* (2021.01); *H01M 50/543* (2021.01); *H01M 10/049* (2013.01); *H01M 10/0436* (2013.01); *H01M 10/058* (2013.01); *H01M 10/0525* (2013.01); *H01M 50/50* (2021.01); *H01M 50/531* (2021.01); *H01M 50/538* (2021.01); *H01M 2200/20* (2013.01)

(58) Field of Classification Search
CPC ............. H01M 2200/20; H01M 50/50; H01M 50/531; H01M 50/538; H01M 50/543; H01M 50/533; H01M 50/54; H01M 50/147
See application file for complete search history.

(56) References Cited

FOREIGN PATENT DOCUMENTS

| | | |
|---|---|---|
| CN | 108258180 A | 7/2018 |
| CN | 209217105 U | 8/2019 |

\* cited by examiner

CURRENT COLLECTOR AND SECONDARY BATTERY

CROSS REFERENCE

The present disclosure is a continuation of International Application No. PCT/CN2019/076294, filed on Feb. 27, 2019, which claims priority to Chinese patent application No. 201811641722.X, titled "Current Collector and Secondary Battery" filed on Dec. 29, 2018, both of which are hereby incorporated by reference in their entireties.

TECHNICAL FIELD

The present disclosure relates to the technical field of battery technology, in particular to a current collector and a secondary battery.

BACKGROUND

With development of science and technology, secondary batteries have been widely used in portable electronic devices, such as mobile phones, digital cameras, and laptop computers, and have a wide range of application prospects in electric transports, such as electric vehicles and electric bicycles, and energy storage facilities and other large and medium-sized electric equipment. It has become an important technical means to solve global problems, such as energy crisis and environmental pollution. In the prior art, a secondary battery includes an electrode assembly and a current collector connected with the electrode assembly. The electrode assembly includes an end face and a pole tab extending from the end face. Since a clearance between the current collector and the end face is small, it is difficult to operate when the current collector and the pole tab are welded via a welding equipment, causing a faulty welding easily occurred between the current collector and the pole tab.

SUMMARY

Embodiments of the present disclosure provide a current collector and a secondary battery. The current collector can ensure a stable and reliable connection with a pole tab, thereby improving reliability and safety of the secondary battery.

In an aspect, an embodiment of the present disclosure provides a current collector for electrically connecting a pole post and a pole tab of a secondary battery, and the current collector comprising: a first sheet; a second sheet intersecting with the first sheet and to be electrically connected with the pole post; a current collecting unit, wherein the current collecting unit and the second sheet are respectively arranged on two opposite sides of the first sheet along its first thickness direction, the first thickness direction intersects with a second thickness direction of the second sheet itself, the current collecting unit comprises a first current collecting sheet to be electrically connected with the pole tab and comprising a first connection end connected with the first sheet, and the first connection end extends in a first direction perpendicular to the first thickness direction and the second thickness direction.

The current collector according to the embodiment of the present disclosure can electrically connect the pole tab of the electrode assembly and the pole post of the top cover assembly. The current collector includes a first current collecting sheet electrically connected with the pole tab. The first current collecting sheet can be connected and fixed with the corresponding pole tab. The current collector of this embodiment is connected and fixed to the pole tab via the first current collecting sheet disposed on the first sheet. In use of the current collector of this embodiment, the first sheet is close to the electrode assembly, and the first current collecting sheet is far away from the electrode assembly, so that an avoidance space can be reserved, which is convenient for welding equipment to weld the first current collecting sheet and the pole tab. Therefore, a difficulty of welding operation is reduced and welding quality is improved, which is beneficial to improving stability of connection between the first current collecting sheet and the pole tab and thus they are not easily separated from each other to ensure stability and safety of the secondary battery in use.

In another aspect, an embodiment of the present disclosure provides a secondary battery comprising: a housing comprising a receiving hole with an opening; a top cover assembly hermetically connected with the housing to close the opening; an electrode assembly disposed within the receiving hole and comprising two or more electrode units, wherein each of the electrode units comprises a main body and a pole tab connected to the main body, and the two or more electrode units are stacked along an extension direction of the receiving hole parallel to the second thickness direction; the current collector of the above embodiment, wherein the first current collecting sheet is electrically connected to the pole tab.

BRIEF DESCRIPTION OF THE DRAWINGS

Below, features, advantages, and technical effects of an exemplary embodiment of the present disclosure will be described with reference to the drawings.

Figure 1:
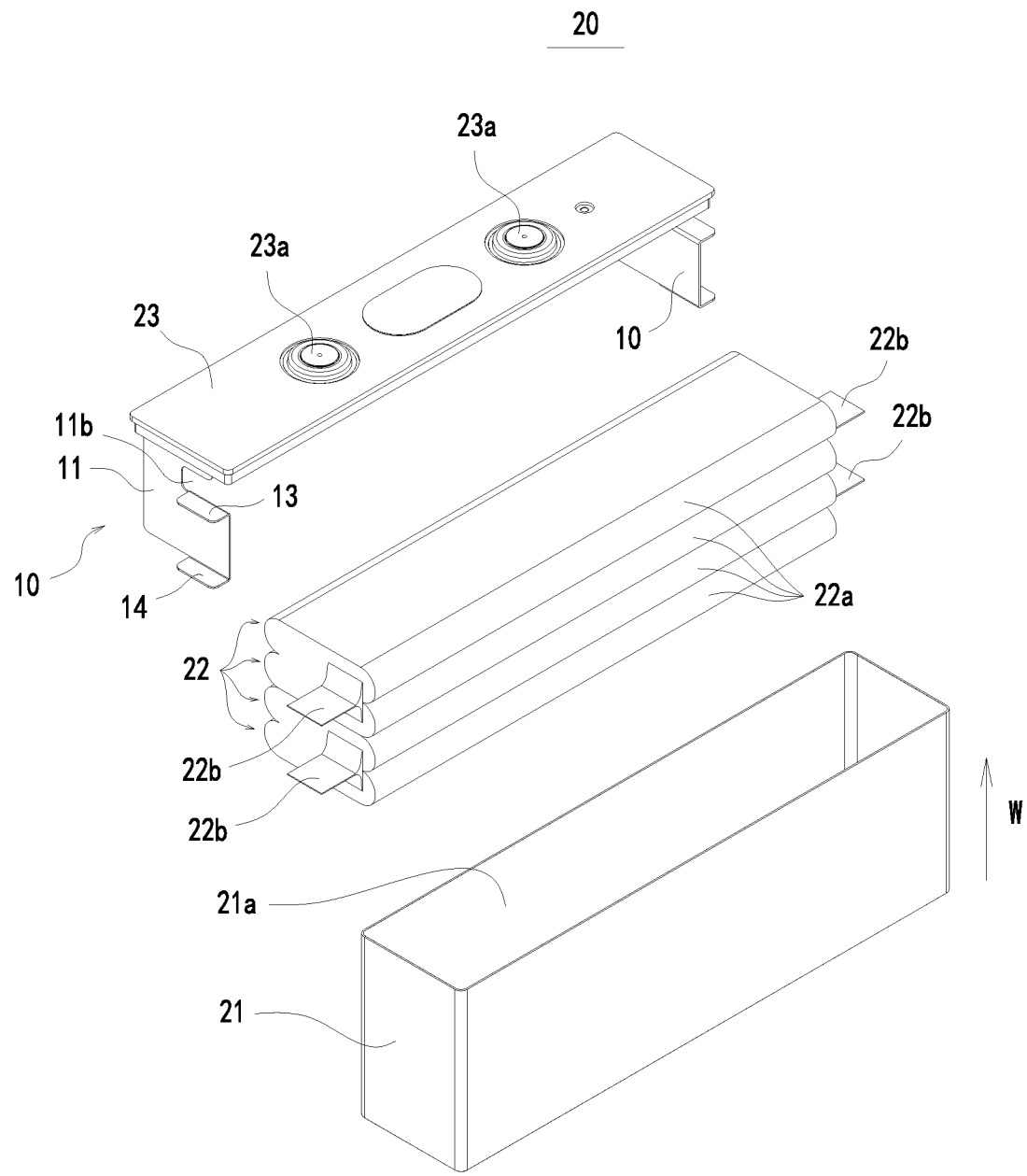
FIG. 1 is a schematic exploded structural diagram of a secondary battery according to an embodiment of the present disclosure.

In the drawings, the drawings are not drawn to actual scale.

DESCRIPTION OF REFERENCE SIGNS 10, current collector; 11, first sheet; 11a, through hole; 11b, avoidance gap; 111, main body; 111a, edge; 112, first outer extension; 113, extension; 114, second outer extension; 12, second sheet; 12a, boss; 13, first current collecting sheet; 14, second current collecting sheet; 15a, first connection surface; 15b, second connection surface; 16a, first connection end 16b, second connection end; 20, secondary battery; 21, housing; 21a, receiving hole; 22, electrode unit; 22a, body; 22b, pole tab;

23. top cover assembly; 23a, pole post; X, first thickness direction; Y, second thickness direction; Z, first direction; W, extension direction.

DETAILED DESCRIPTION

Below, embodiments of the present disclosure will be further described in detail with reference to accompanying drawings and embodiments. The detailed description of the embodiments and the accompanying drawings are intended to illustrate the principles of the present disclosure and are not intended to limit the scope of the present disclosure.

In the description of the present disclosure, it should be noted that, unless otherwise stated, the meaning of "a plurality" and the like is two or more; the orientation or positional relationship indicated by the terms "upper", "lower", "left", "right", "inside", "outside" and the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second", "third" and the like are used for descriptive purposes only and are not to be construed as indicating or implying relative importance.

In the description of the present disclosure, it should be noted that, unless otherwise stated, the terms "installation", "connected to", and "connected with" are to be understood broadly, and may be, for example, a fixed connection, a detachable connection, or an integral connection; they can be connected directly or indirectly through an intermediate medium. The specific meaning of the above terms in the present disclosure can be understood by those skilled in the art according to actual circumstance.

In order to better understand the present disclosure, a secondary battery 20 and a current collector 10 according to embodiments of the present disclosure will be described in detail below with reference to FIGS. 1 to 8.

Figure 2:
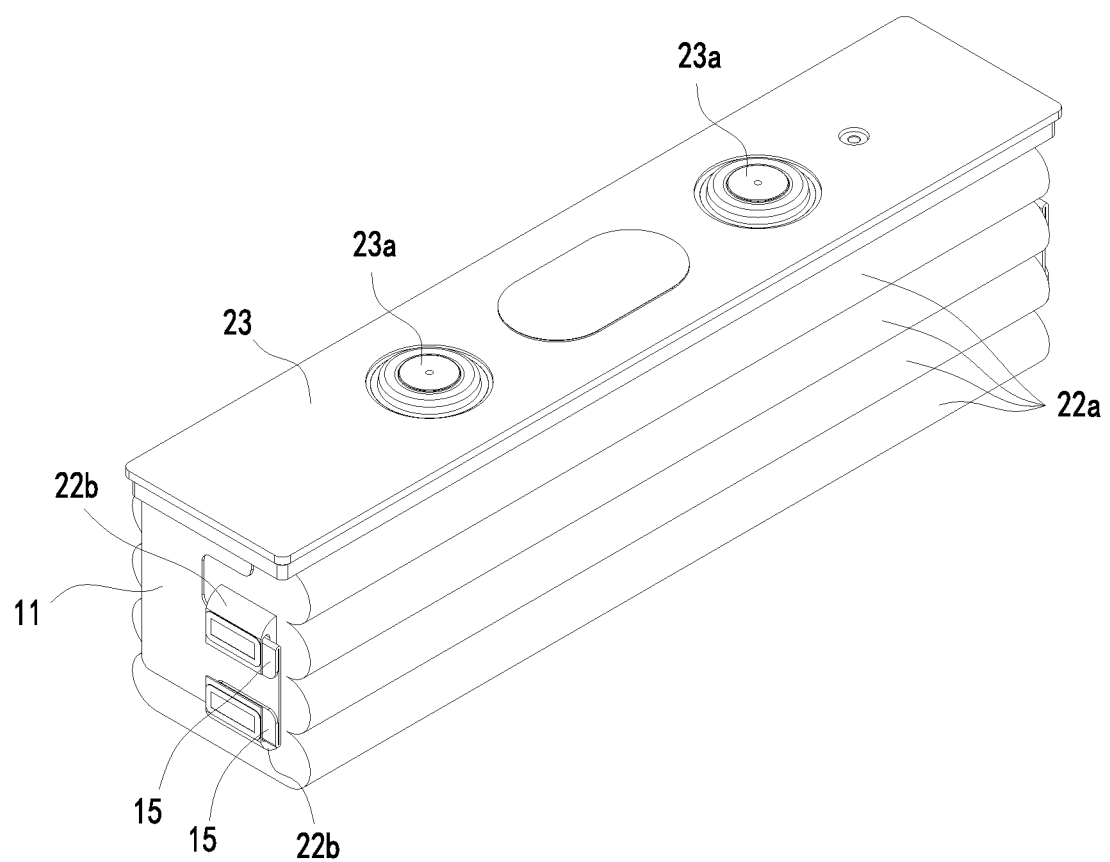
FIG. 2 is a schematic partial structural diagram of a secondary battery according to an embodiment of the present disclosure.

Referring to FIG. 1 and FIG. 2, the secondary battery 20 of the embodiment of the present disclosure includes a housing 21, an electrode assembly disposed within the housing 21, and a top cover assembly 23 hermetically connected to the housing 21.

The housing 21 of this embodiment may be in a shape of a quadrangular prism or other shapes. The housing 21 includes a receiving hole 21a for receiving an electrode assembly and electrolyte. The receiving hole 21a includes an opening. The housing 21 may be made of materials, such as aluminum, aluminum alloy, or plastic.

The electrode assembly of this embodiment includes two or more electrode units 22 stacked along an extension direction W of the receiving hole 21a. A body of the electrode unit 22 and a pole tab 22b connected to the body of this embodiment can be formed by a stacking or winding of a first pole piece, a second pole piece, and an insulating film together. The insulating film is provided as an insulator between the first pole piece and the second pole piece. The electrode unit 22 of this embodiment includes one insulating film, one first pole piece, one insulating film and one second pole piece. In this embodiment, the first pole piece is exemplarily described as a positive pole piece and the second pole piece is a negative pole piece. Similarly, in other embodiments, the first pole piece may also be a negative pole piece, and the second pole piece is a positive pole piece. In addition, positive electrode active material is coated on a coating area of the positive pole piece, and negative electrode active material is coated on a coating area of the negative pole piece. Multiple uncoated areas extending from the body 22a serve as the pole tabs 22b. Each electrode unit 22 includes two pole tabs 22b, namely, a positive pole tab and a negative pole tab. The positive pole tab extends from the coating area of the positive pole piece; the negative pole tab extends from the coating area of the negative pole piece.

The top cover assembly 23 of this embodiment includes a top cover plate and a pole post 23a. The top cover assembly 23 is hermetically connected to the housing 21 via the top cover plate. The pole post 23a is disposed on the top cover plate and is electrically connected to the electrode assembly.

Figure 3:
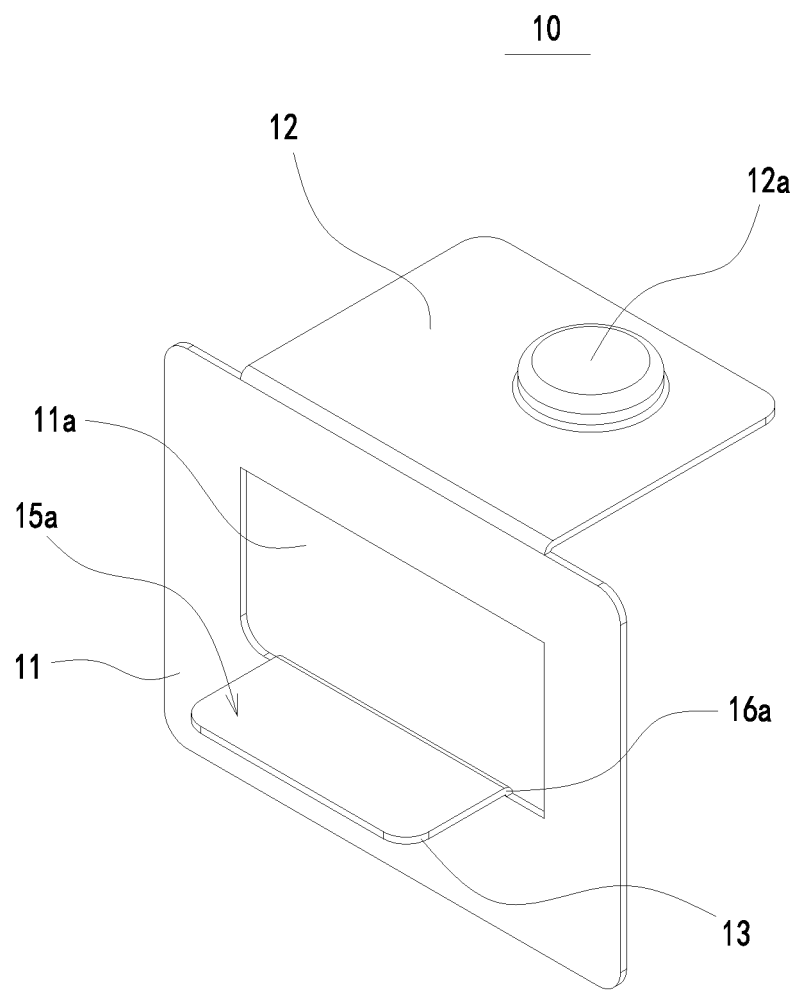
FIG. 3 is a schematic structural diagram of a current collector according to an embodiment of the present disclosure.

Referring to FIG. 3, an embodiment of the present disclosure provides a current collector 10 for electrically connecting the pole post 23a of the secondary battery 20 and the pole tab 22b of the electrode unit 22. The current collector 10 includes a first sheet 11, a second sheet 12, and a current collecting unit. The first sheet 11 and the second sheet 12 are disposed to intersect each other. Both the first sheet 11 and the second sheet 12 have a predetermined thickness. The first sheet 11 extends along a first thickness direction X of its own thickness to intersect the second sheet 12 extending along a second thickness direction Y of its own thickness. The current collecting unit and the second sheet 12 are respectively disposed on two opposite sides of the first sheet 11 along the first thickness direction X. The first thickness direction X intersects the second thickness direction Y of the second sheet 12 itself. Optionally, the first thickness direction X is perpendicular to the second thickness direction Y of the second sheet 12 itself. The current collecting unit and the second sheet 12 both extend in the first thickness direction X, but extend in opposite directions relative to each other. The current collecting unit includes a first current collecting sheet 13 that can be folded. The first current collecting sheet 13 is used to be electrically connected with the pole tab 22b. The first current collecting sheet 13 includes a first connection end 16a connected to the first sheet 11. The first connection end 16a extends in a first direction Z perpendicular to the first thickness direction X and the second thickness direction Y. The second sheet 12 is used for electrical connection with the pole tab 23a. In one embodiment, the second sheet 12 includes a boss 12a. The boss 12a extends along the second thickness direction Y and away from the first current collecting sheet 13. The boss 12a of the second sheet 12 is used for electrical connection with the pole post 23a.

The current collector 10 of the embodiment of the present disclosure can electrically connect the pole tab 22b of the electrode assembly and the pole post 23a of the top cover assembly 23. The current collector 10 includes the first current collecting sheet 13 for electrical connection with the pole tab 22b. The first current collecting sheet 13 can be connected and fixed with the corresponding pole tab 22b. The current collector of this embodiment is connected and fixed to the pole tab via the first current collecting sheet disposed on the first sheet. When the current collector of this embodiment is in use, the first sheet is close to the electrode assembly, and the first current collecting sheet is far away from the electrode assembly, so that an avoidance space can be reserved for welding operation between the first current collecting sheet and the pole tab via welding equipment.

Therefore, difficulty of the welding operation is effectively reduced and welding quality is improved, which is beneficial to improving stability of a connection between the first current collecting sheet 13 and the pole tab 22b so they are not easily separated from each other, ensuring stability and safety of the secondary battery 20 in use.

Referring to FIGS. 4 to 8, the current collector 10 of the embodiment of the present disclosure includes a second current collecting sheet 14 that can be folded. The second current collecting sheet 14 is connected to the first sheet 11. The first current collecting sheet 13 and the second current collecting sheet 14 are disposed to be spaced apart along the second thickness direction Y. The second current collecting sheet 14 is used to be electrically connected with the pole tab 22b. The second current collecting sheet 14 includes a second connection end 16b connected to the first sheet 11. The second connection end 16b extends in the first direction Z perpendicular to the first thickness direction X and the second thickness direction Y.

The electrode assembly of this embodiment includes four electrode units 22. The four electrode units 22 are divided into two sets. Two electrode units 22 in each set of electrode units 22 are electrically connected by respective pole tabs 22b. The pole tabs 22b of each of the two sets of electrode units 22 are spaced apart in the extension direction W of the receiving hole 21a, and both can be aligned in the extension direction W or staggered in the second thickness direction Y. The extension direction W of this embodiment is the same as the second thickness direction Y. The pole tabs 22b of the two sets of electrode units 22 are electrically connected to the first current collecting sheet 13 and the second current collecting sheet 14 of the current collector 10, respectively. It is easy to understand that a number of electrode units 22 in each set is not limited to two, and may be one or more than three. Optionally, the pole tab 22b and the first current collecting sheet 13 or the pole tab 22b and the second current collecting sheet 14 may be connected in a welded way by means of ultrasonic welding.

Both the first current collecting sheet 13 and the second current collecting sheet 14 of this embodiment extend towards one side of the first sheet 11 along the first thickness direction X. That is, the thickness direction of the first current collecting sheet 13 and the second current collecting sheet 14 is the same as the second thickness direction Y of the second sheet 12. The first current collecting sheet 13 and the second current collecting sheet 14 are located on the same side of the first sheet 11. The first current collecting sheet 13 and the second current collecting sheet 14 are spaced apart by a predetermined distance in the second thickness direction Y to form an avoidance space between them. When the first current collecting sheet 13 and the second current collecting sheet 14 are connected to the pole tabs 22b by ultrasonic welding, it is convenient for an ultrasonic equipment to clamp the first current collecting sheet 13 or the second current collecting sheet 14 from both sides of the current collecting sheet 13 or the second current collecting sheet 14 along the second thickness direction Y, so as to facilitate ultrasonic welding operation. In one embodiment, both the first current collecting sheet 13 and the second current collecting sheet 14 can be folded in the first thickness direction X. In one example, the thickness direction of the folded first current collecting sheet 13 and the folded second current collecting sheet 14 is the same as the first thickness direction X, and thus parallel to the first sheet 11. Further, the first current collecting sheet 13 and the second current collecting sheet 14 are folded toward each other in the second thickness direction Y and can contact the first sheet 11. After the first current collecting sheet 13 and the second current collecting sheet 14 are connected and fixed to the pole tabs 22b, the first current collecting sheet 13 and the second current collecting sheet 14 are folded to reduce a space occupancy rate. Moreover, since the first sheet 11 is in contact with the electrode assembly, and is located between one the folded first current collecting sheet 13 and the folded second current collecting sheet 14 and the electrode assembly, the first current collecting sheet 13 and the second current collecting sheet 14 that have been folded will contact the first sheet 11 but not the electrode assembly, thereby reducing the possibility of scratching or puncturing the electrode assembly after the first current collecting sheet 13 and the second current collecting sheet 14 are folded. In one embodiment, the first current collecting sheet 13 is disposed closer to the second sheet 12 than the second current collecting sheet 14.

Figure 4:
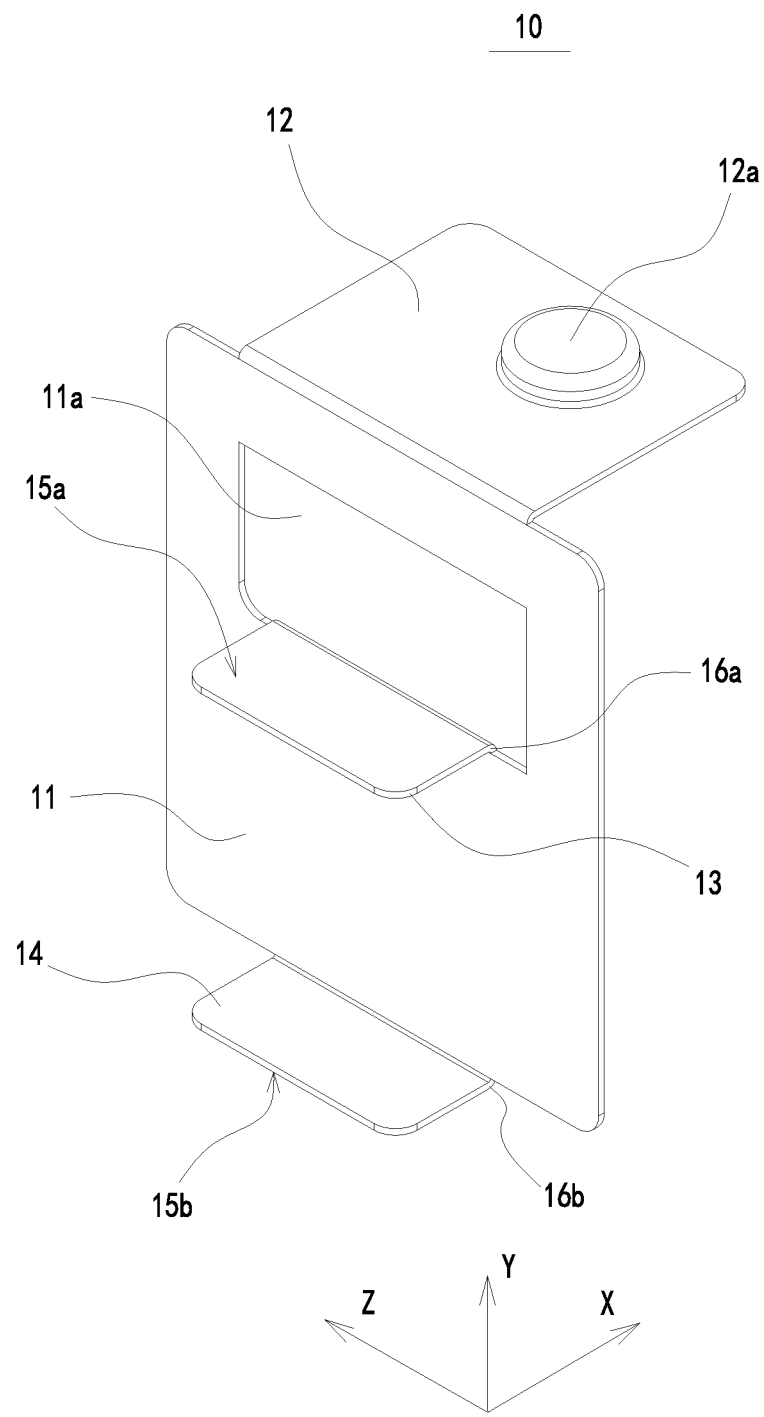
FIG. 4 is a schematic structural diagram of a current collector according to another embodiment of the present disclosure.

In one embodiment, the second current collecting sheet 14 includes a second connection surface 15b. The surface of the first current collecting sheet 13 facing away from the second current collecting sheet 14 is the first connecting surface 15a. The surface of the second current collecting sheet 14 facing away from the first current collecting sheet 13 is a second connection surface 15b. Referring to FIG. 4, the first sheet 11 of this embodiment includes a through hole 11a extending along the first thickness direction X. The surface of the first current collecting sheet 13 facing the through hole 11a forms a first connection surface 15a. The first connection surface 15a of the first current collecting sheet 13 and the through hole 11a are adjacently arranged along the second thickness direction Y. The pole tab 22b can pass through the through hole 11a in the first thickness direction X to be connected to the first connection surface 15a. The through hole 11a can avoid positional interference between the pole tab 22b and the first sheet 11, and also help reduce a size of the first sheet 11, thereby helping to improve overall compactness of the current collector 10 and reduce a space occupancy rate. Moreover, it is also beneficial to reducing weight of the first sheet 11, thereby helping to increase energy density of the secondary battery 20. In this embodiment, the surface of the first current collecting sheet 13 facing the through hole 11a is the first connection surface 15a, and the surface of the second current collecting sheet 14 facing away from the second sheet 12 is the second connection surface 15b.

Figure 5:
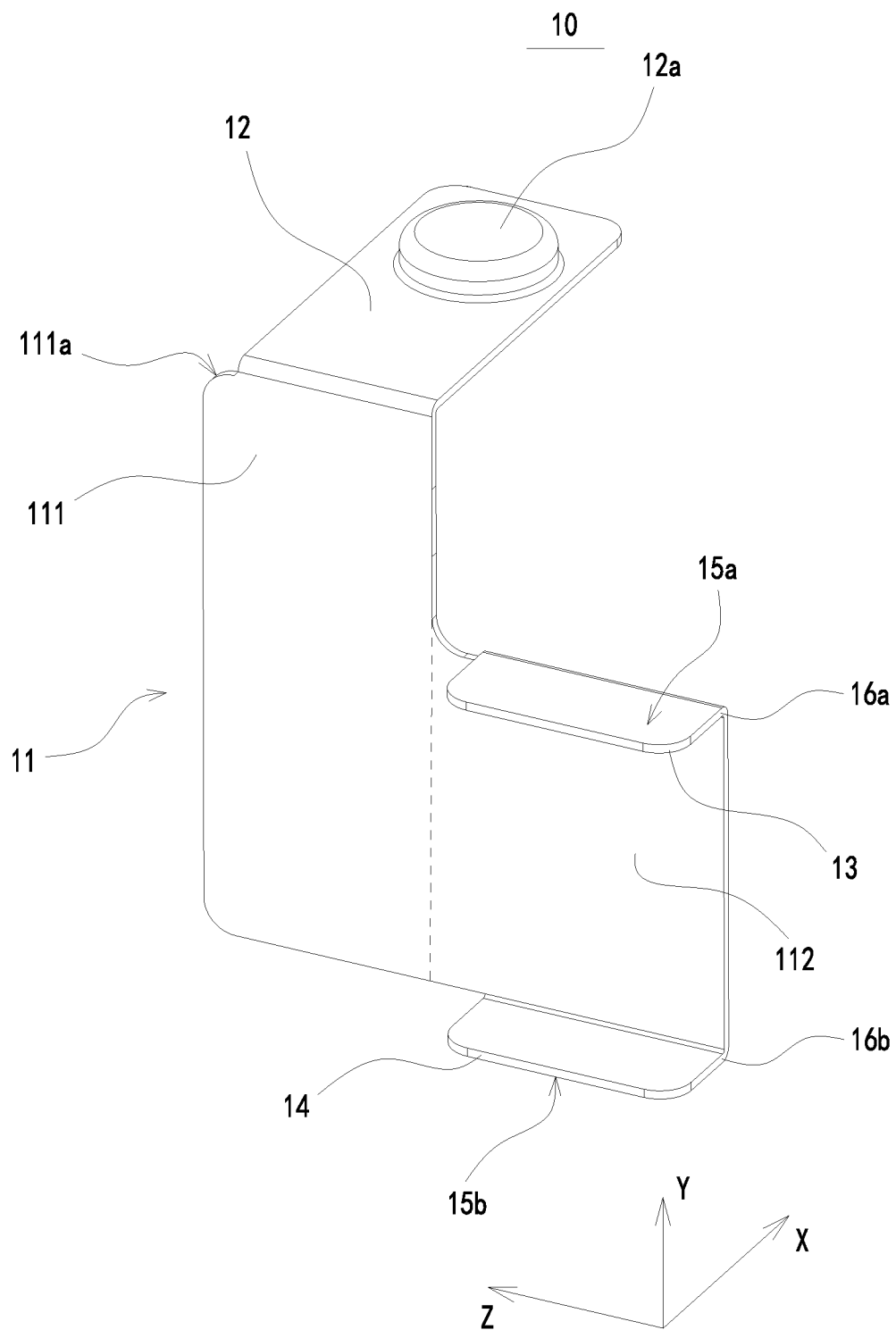
FIG. 5 is a schematic structural diagram of a current collector according to another embodiment of the present disclosure.
Figure 6:
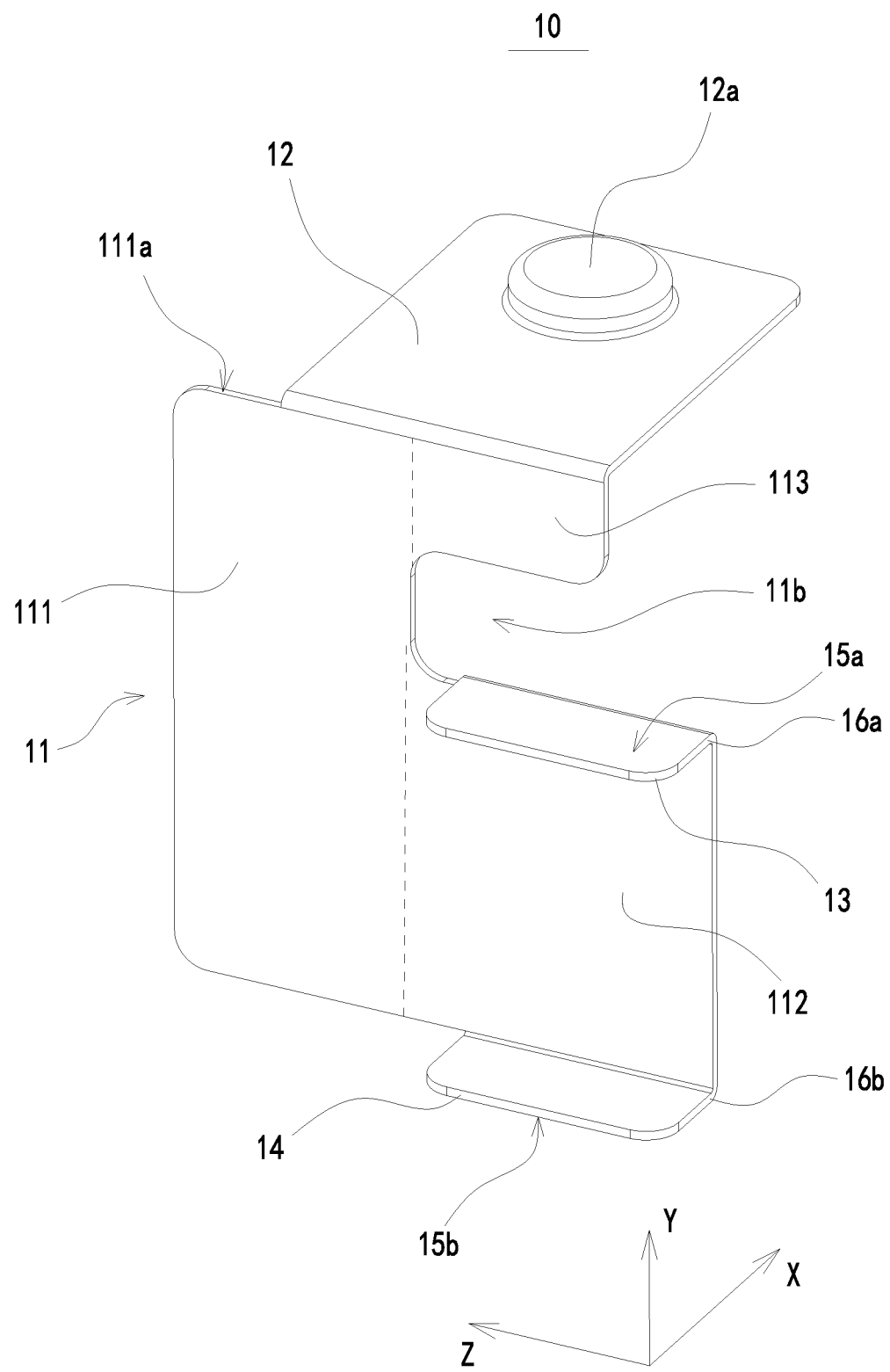
FIG. 6 is a schematic structural diagram of a current collector according to another embodiment of the present disclosure.
Figure 7:
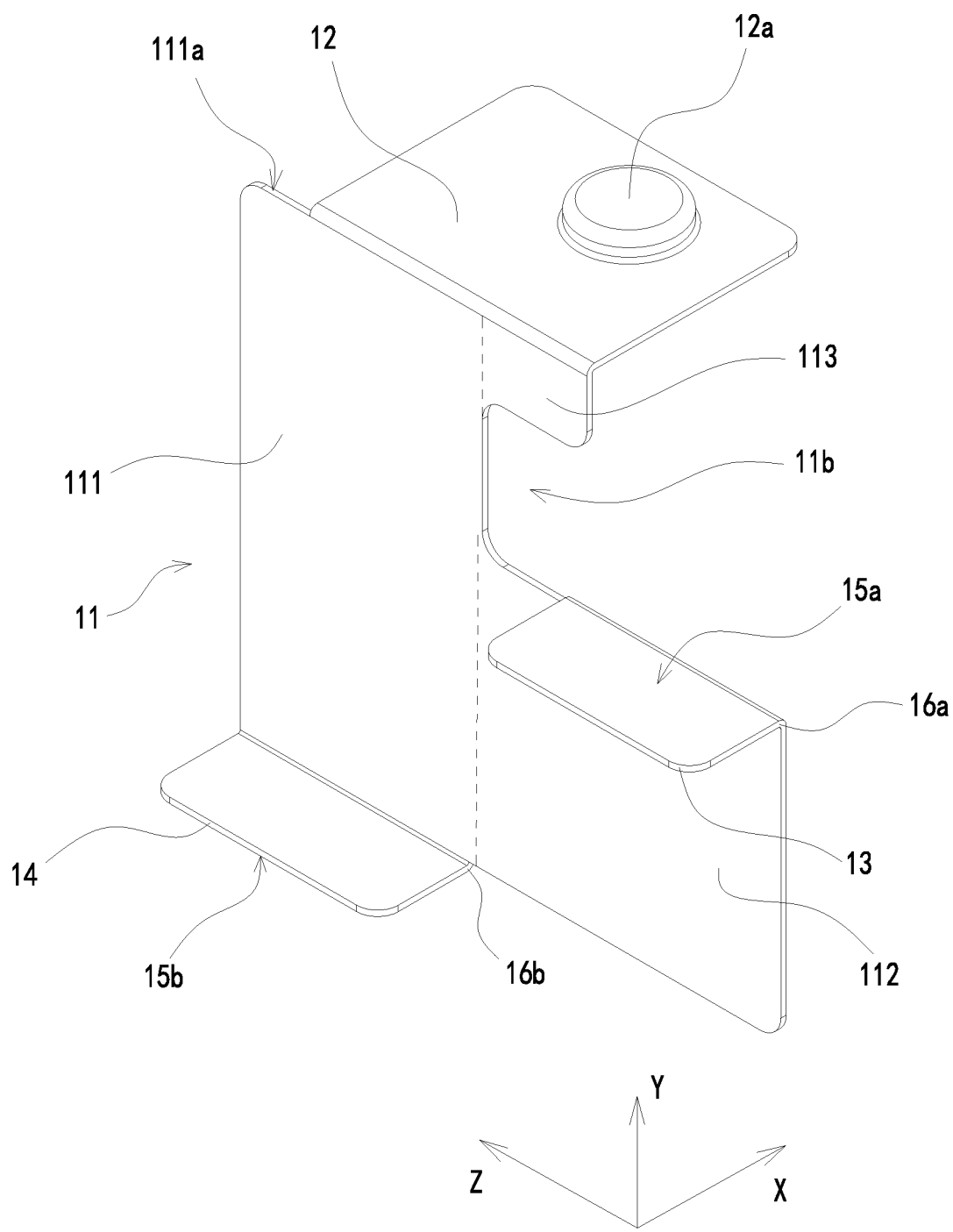
FIG. 7 is a schematic structural diagram of a current collector according to another embodiment of the present disclosure.

Referring to FIGS. 5 to 7, the first sheet 11 of this embodiment includes a main body 111 connected to the second sheet 12 and extending in the second thickness direction Y, and a first outer extension 112 connected to the main body 111. The first sheet 11 is connected to the second sheet 12 via the main body 111. Since the first outer extension 112 is provided, the main body 111 does not need to be provided with the through hole 11a, which is beneficial to improving flow capacity of the main body 111. The first outer extension 112 extends towards an outside of the main body 111 along the first direction Z. At least one of the first current collecting sheet 13 and the second current collecting sheet 14 is connected to the first outer extension 112. In this embodiment, the surface of the first current collecting sheet 13 facing the second sheet 12 along the second thickness direction Y is the first connection surface 15a, and the surface of the second current collecting sheet 14 facing away from the second sheet 12 is the second connection surface 15b. In one embodiment, referring to FIGS. 5 and 6, both the first current collecting sheet 13 and the second current collecting sheet 14 are disposed on the first outer extension 112. Optionally, both the first current collecting sheet 13 and the second current collecting sheet 14 are connected to the first outer extension 112, and the first current collecting sheet 13 and the second current collecting sheet 14 at least partially overlap along the second thickness direction Y. Optionally, the first current collecting sheet 13 and the second current collecting sheet 14 have the same structure, and the first current collecting sheet 13 and the second current collecting sheet 14 are aligned along the second thickness direction Y. In another embodiment, referring to FIG. 7, the first current collecting sheet 13 is disposed on the first outer extension 112, and the second current collecting sheet 14 is disposed on the main body 111.

Referring to FIG. 6 and FIG. 7, the first sheet 11 of this embodiment includes an avoidance gap 11b. The avoidance gap 11b extends along the first direction Z. The first connection surface 15a of the first current collecting sheet 13 and the avoidance gap 11b are adjacently arranged along the second thickness direction Y. The pole tab 22b can pass through the avoidance gap 11b to be connected to the first connecting surface 15a of the first current collecting sheet 13. The avoidance gap 11b can avoid positional interference between the pole tab 22b and the first sheet 11, and also help reduce the size of the first sheet 11. Thus it is beneficial to improving the compactness of the current collector 10 and reduce the space occupancy rate, and further beneficial to reducing the weight of the first sheet 11 to improve the energy density of the secondary battery 20. In one embodiment, both the first current collecting sheet 13 and the second current collecting sheet 14 are disposed on the first outer extension 112. The main body 111 includes an extension 113 extending in the first direction Z. The extension 113 and the first outer extension 112 are spaced apart along the second thickness direction Y to form the avoidance gap 11b. Optionally, the avoidance structure is a groove-shaped structure extending along the first direction Z. In one embodiment, the avoidance gap 11b extends along the first direction Z and beyond the first current collecting sheet 13. A length of the avoidance gap 11b extending in the first direction Z is greater than a length of the first current collecting sheet 13 extending in the first direction Z. In this way, when the pole tab 22b passes through the avoidance gap 11b, the pole tab 22b will not come into contact with the main body 111 to press the pole tab 22b, thereby reducing the possibility of deformation or breakage of the pole tab 22b squeezed by the main body 111, and also reducing the possibility of an inaccurate and unstable connection area with the first current collecting sheet 13 caused by a misalignment of the pole tab 22b.

Referring to FIGS. 2 to 7, in this embodiment, in the first direction Z, an edge 111a of the main body 111 away from the first outer extension 112 extends beyond the second sheet 12. Since the first sheet 11 is provided with the through hole 11a, the first outer extension 112 or the avoidance structure, the edge 111a of the main body 111 is provided to go beyond the second sheet 12 under the premise that the size of the main body 111 itself is restricted, which is beneficial to increasing the flow area between the main body 111 and the second sheet 12, and reduce the possibility of fusing of a transition area between the main body 111 and the second sheet 12 due to excessive current to improve safety and stability of the secondary battery 20 in use.

Referring to FIGS. 6 and 7, in this embodiment, in the second thickness direction Y, at least a part of the first outer extension 112 and the extension 113 are overlapped. In this way, without increasing an overall size of the first sheet 11, it can be ensured that the first sheet 11 is provided with the avoidance gap 11b, and moreover it can be ensured that a connection transition area between the main body 111 and the second sheet 12 has a larger flow area. Therefore, on the one hand, it is beneficial to improving structural compactness of the first sheet 11 and the energy density of the secondary battery 20, and on the other hand, a good flow capacity between the first sheet 11 and the second sheet 12 is also ensured to improve working stability and reliability of the secondary battery 20.

Figure 8:
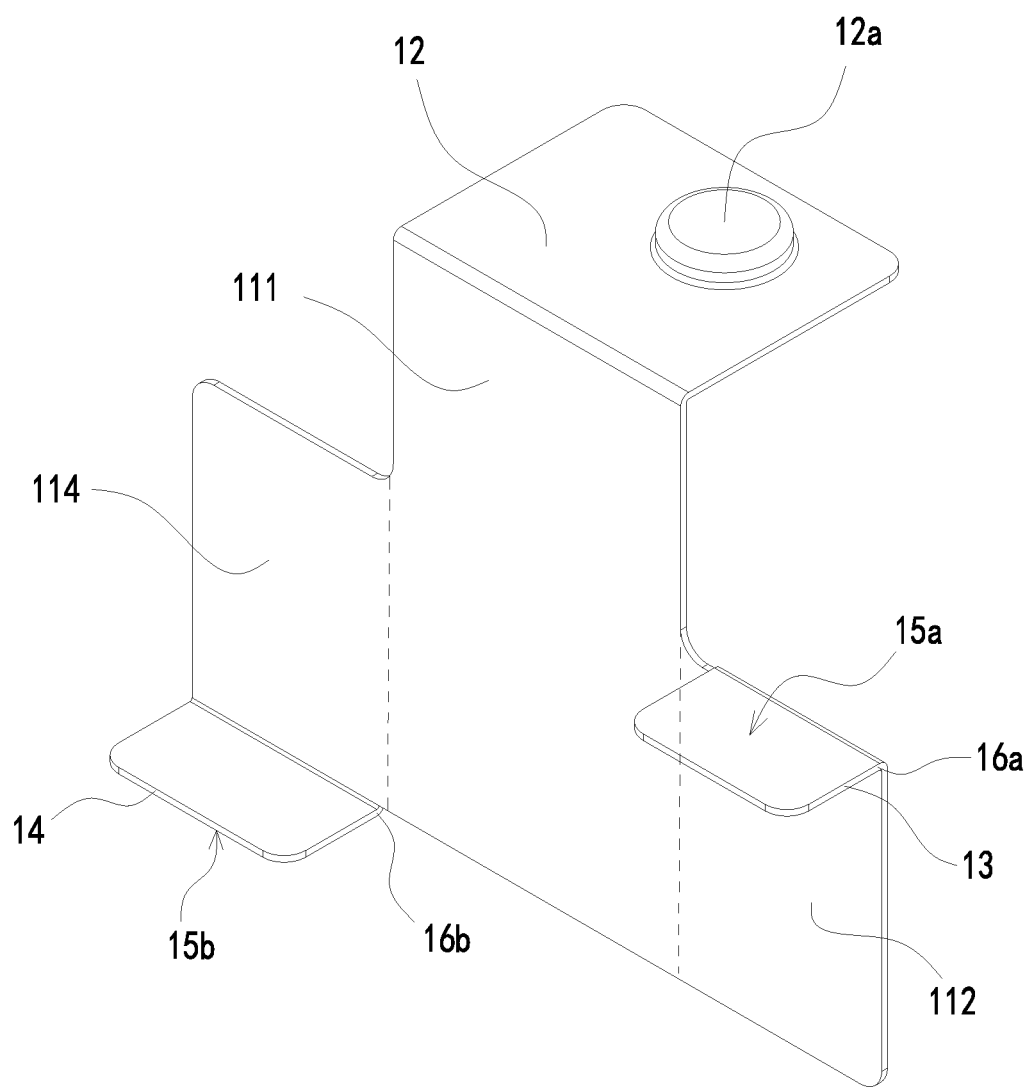
FIG. 8 is a schematic structural diagram of a current collector according to still another embodiment of the present disclosure.

As shown in FIG. 8, the first sheet 11 of the embodiment of the present disclosure further includes a second outer extension 114 connected to the main body 111. The first outer extension 112 and the second outer extension 114 are respectively disposed on two opposite sides of the main body 111 along the first direction Z. The first current collecting sheet 13 is connected to an end of the first outer extension 112 along the second thickness direction Y. The second current collecting sheet 14 is connected to an end of the second outer extension 114 along the second thickness direction Y. Since a lot of heat will generate at a connection area between each of the first current collecting sheet 13 and the second current collecting sheet 14 and the pole tab 22b, when the first current collecting sheet 13 and the second current collecting sheet 14 are staggered, it is beneficial to reducing the possibility of a rapid rise of temperature at the connection area between each of the first current collecting sheet 13 and the second current collecting sheet 14 and the pole tab 22b, caused by an accumulation of heat released at the connection area between each of the first current collecting sheet 13 and the second current collecting sheet 14 and the pole tab 22b, to ensure connection stability of the connection area between each of the first current collecting sheet 13 and the second current collecting sheet 14 and the pole tab 22b.

The secondary battery 10 of the embodiment of the present disclosure includes the housing 11, the electrode assembly 12 disposed within the housing 11, and the top cover assembly 13 hermetically connected with the housing 11. Two or more electrode units 121 included in the electrode assembly 12 are stacked along the extension direction W of the housing 11. When the electrode unit 121 of this embodiment expands, the electrode unit 121 mainly expands in the extension direction W of the receiving hole 11a, so that the electrode unit 121 can release an expansion force along the extension direction W of the receiving hole 11a, and the expansion force released in the thickness direction of the secondary battery 10 itself is small, so that excessive compressive stress will not be generated on a side plate 112 of the housing 11. In this way, when two or more secondary batteries 10 of this embodiment are arranged side by side along their own thickness direction and assembled to form a battery module 20, since a main expansion force generated when each secondary battery 10 expands intersects the thickness direction, the main expansion force generated by each secondary battery 10 does not accumulate in the thickness direction and forms a large resultant force. When an external fixing member is used to fix the battery module 20 including two or more secondary batteries of this embodiment, requirements for rigidity and strength of the fixing member itself are relatively low, which is advantageous in reducing volume or weight of the fixing member, and is further beneficial to improving the energy density and space utilization of the secondary battery and the battery module 20 as a whole.

Although the present disclosure has been described with reference to optional embodiments, various modifications can be made thereto and the components therein can be replaced with equivalents without departing from the scope of the present disclosure, especially as long as there is no structural conflict, the technical features mentioned in the embodiments can be combined in any way. The present disclosure is not limited to the specific embodiments disclosed herein, but includes all technical solutions falling within the scope of the claims.

What is claimed is:

1. A current collector for electrically connecting a pole post and a pole tab of a secondary battery, and the current collector comprising:
   a first sheet;
   a second sheet intersecting with the first sheet and to be electrically connected with the pole post;
   a current collecting unit, wherein the current collecting unit and the second sheet are respectively arranged on two opposite sides of the first sheet along a first thickness direction of the first sheet, the first thickness direction intersects with a second thickness direction of the second sheet, the current collecting unit comprises a first current collecting sheet to be electrically connected with the pole tab, and wherein the first current collecting sheet comprises a first connection end configured to be connected with the first sheet, and wherein the first connection end extends in a first direction which is perpendicular to the first thickness direction and the second thickness direction.

2. The current collector according to claim 1, wherein the current collecting unit further comprises a second current collecting sheet, the first current collecting sheet and the second current collecting sheet are disposed to be spaced apart along the second thickness direction, the second current collecting sheet is used to be electrically connected with the pole tab, and wherein the second current collecting sheet comprises a second connection end configured to be connected to the first sheet, and the second connection end extends along the first direction.

3. The current collector according to claim 2, wherein both the first current collecting sheet and the second current collecting sheet extend towards one side of the first sheet in the first thickness direction, and both the first current collecting sheet and the second current collecting sheet are configured to be folded in the first thickness direction.

4. The current collector according to claim 3, wherein compared with the second current collecting sheet, the first current collecting sheet is disposed closer to the second sheet.

5. The current collector according to claim 2, wherein the first sheet comprises a main body connected to the second sheet and extending in the second thickness direction and a first outer extension connected to the main body, the first outer extension extends towards an outside of the main body along the first direction, and at least one of the first current collecting sheet and the second current collecting sheet is connected to the first outer extension.

6. The current collector according to claim 5, wherein both the first current collecting sheet and the second current collecting sheet are connected to the first outer extension and are at least partially overlapped along the second thickness direction.

7. The current collector according to claim 6, wherein the first sheet comprises an avoidance gap extending along the first direction, the first current collecting sheet comprises a first connection surface located on a side of the first current collecting sheet close to the avoidance gap, and the pole tab can pass through the avoidance gap to be connected to the first connection surface.

8. The current collector according to claim 7, wherein both the first current collecting sheet and the second current collecting sheet are disposed on the first outer extension, the main body comprises an extension extending along the first direction, and the extension and the first outer extension are spaced apart along the second thickness direction to form the avoidance gap.

9. The current collector according to claim 8, wherein the avoidance gap extends along the first direction and beyond the first current collecting sheet.

10. The current collector according to claim 8, wherein an edge of the main body away from the first outer extension goes beyond the second sheet in the first direction.

11. The current collector according to claim 8, wherein at least a part of the first outer extension and the extension are overlapped with each other in the second thickness direction.

12. The current collector according to claim 7, wherein the second current collecting sheet comprises a second connection surface, a surface of the first current collecting sheet facing away from the second current collecting sheet is provided as the first connection surface, and a surface of the second current collecting sheet facing away from the first current collecting sheet is provided as the second connection surface.

13. The current collector according to claim 5, wherein the first sheet further comprises a second outer extension connected to the main body, the first outer extension and the second outer extension are respectively disposed on two opposite sides of the main body along the first direction, the first current collecting sheet is connected to an end of the first outer extension along the second thickness direction, and the second current collecting sheet is connected to an end of the second outer extension along the second thickness direction.

14. The current collector according to claim 1, wherein the first sheet includes a through hole extending along the first thickness direction, the first current collecting sheet comprises a first connection surface, a surface of the first collecting sheet facing the through hole is provided as the first connection surface, and the pole tab can pass through the through hole to be connected to the first connection surface.

15. A secondary battery comprising:
   a housing comprising a receiving hole with an opening;
   a top cover assembly hermetically connected with the housing to close the opening;
   an electrode assembly disposed within the receiving hole and comprising two or more electrode units, wherein each of the electrode units comprises a body and a pole tab connected to the body, and the two or more electrode units are stacked along an extension direction of the receiving hole parallel to the second thickness direction;
   a current collector for electrically connecting a pole post and the pole tab of the secondary battery, and comprising:
   a first sheet;
   a second sheet intersecting with the first sheet and to be electrically connected with the pole post;
   a current collecting unit, wherein the current collecting unit and the second sheet are respectively arranged on two opposite sides of the first sheet along first thickness direction of the first sheet, the first thickness direction intersects with a second thickness direction of the second sheet, the current collecting unit comprises a first current collecting sheet to be electrically connected with the pole tab, and wherein the first current collecting sheet comprises a first connection end configured to be connected with the first sheet, and wherein the first connection end extends in a first direction which is perpendicular to the first thickness direction and the second thickness direction.

16. The secondary battery according to claim 15, wherein the current collecting unit further comprises a second current collecting sheet, the first current collecting sheet and the second current collecting sheet are disposed to be spaced apart along the second thickness direction, the second current collecting sheet is used to be electrically connected with the pole tab, and wherein the second current collecting sheet comprises a second connection end configured to be connected to the first sheet, and the second connection end extends along the first direction.

17. The secondary battery according to claim 16, wherein both the first current collecting sheet and the second current collecting sheet extend towards one side of the first sheet in the first thickness direction, and both the first current collecting sheet and the second current collecting sheet are configured to be folded in the first thickness direction.

18. The secondary battery according to claim 17, wherein compared with the second current collecting sheet, the first current collecting sheet is disposed closer to the second sheet.

19. The secondary battery according to claim 16, wherein the first sheet comprises a main body connected to the second sheet and extending in the second thickness direction and a first outer extension connected to the main body, the first outer extension extends towards an outside of the main body along the first direction, and at least one of the first current collecting sheet and the second current collecting sheet is connected to the first outer extension.

20. The secondary battery according to claim 19, wherein both the first current collecting sheet and the second current collecting sheet are connected to the first outer extension and are at least partially overlapped along the second thickness direction.

* * * * *